United States Patent [19]

Smith

[11] 4,051,979
[45] Oct. 4, 1977

[54] PNEUMATIC SERVO SYSTEM UTILIZING HEAT SQUIB AND EXPLOSIVE VALVE

[75] Inventor: James M. Smith, Fanibel Island, Fla.

[73] Assignee: The United States of America as represented by the Secretary of the Army, Washington, D.C.

[21] Appl. No.: 685,552

[22] Filed: May 12, 1976

[51] Int. Cl.² .............................................. B01J 7/00
[52] U.S. Cl. .......................................... 222/3; 62/48
[58] Field of Search ......................... 62/48, 50; 222/3

[56] References Cited

U.S. PATENT DOCUMENTS

| | | | |
|---|---|---|---|
| 3,117,424 | 1/1964 | Hebenstreit | 222/3 |
| 3,163,014 | 12/1964 | Wismar | 222/3 X |
| 3,232,481 | 2/1966 | Hebenstreit | 222/3 |
| 3,726,649 | 4/1973 | Pelham | 222/3 X |
| 3,731,948 | 5/1973 | Risko | 222/3 X |

Primary Examiner—Robert B. Reeves
Assistant Examiner—David A. Scherbel
Attorney, Agent, or Firm—Nathan Edelberg; Robert P. Gibson; James T. Deaton

[57] ABSTRACT

A pneumatic servo system which has a storage tank filled to a predetermined pressure with an inert gas such as nitrogen that is heated by a heat squib device to raise the temperature of the gas and also to increase the pressure of the gas in the storage tank and be supplied through an explosive actuated frangible valve to a pressure regulator for regulating an outlet pressure to a servo valve for controlling flow to and from a pneumatic motor.

5 Claims, 1 Drawing Figure

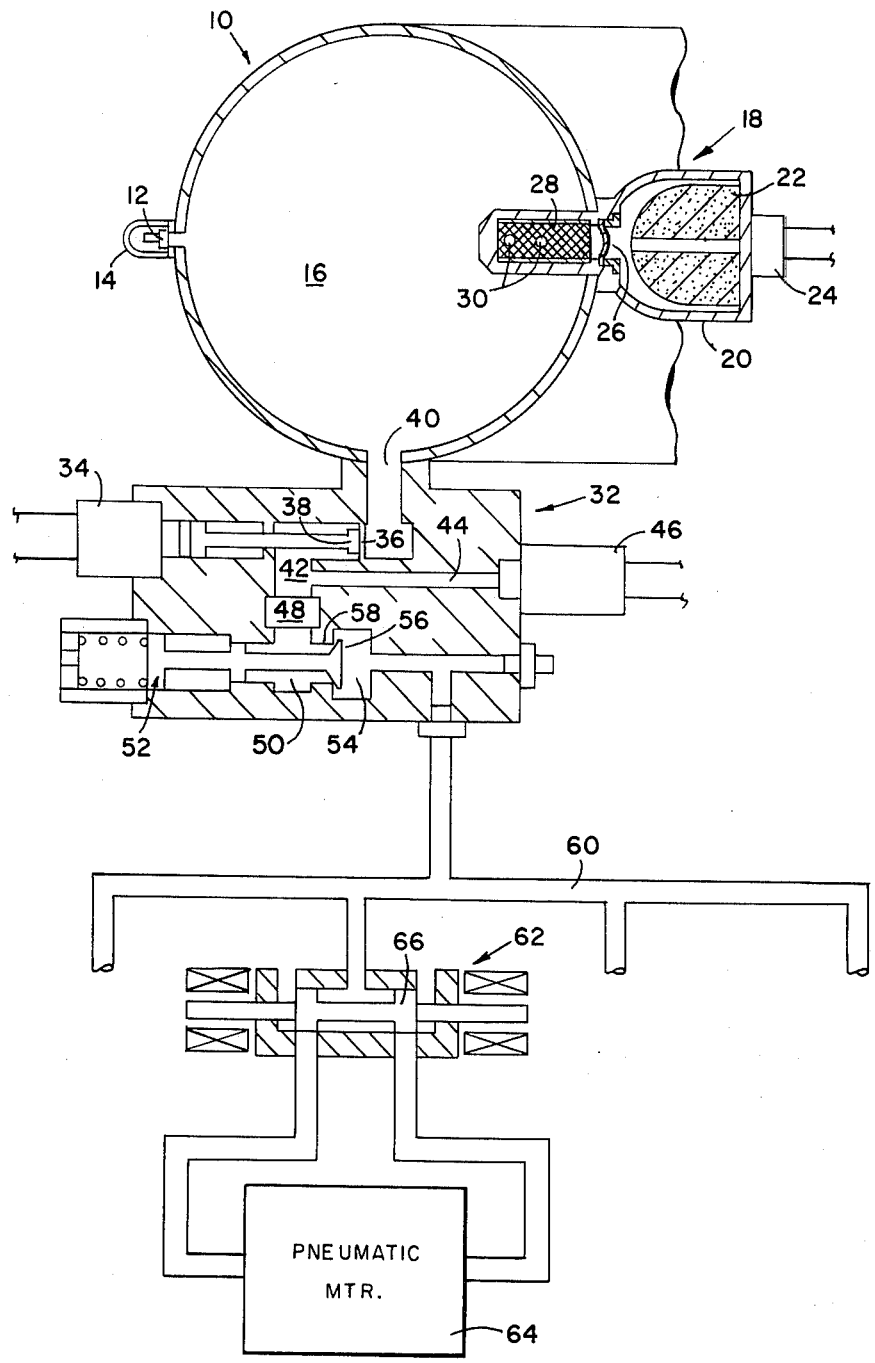

PNEUMATIC SERVO SYSTEM UTILIZING HEAT SQUIB AND EXPLOSIVE VALVE

DEDICATORY CLAUSE

The invention described herein was made under contract with the Government and may be manufactured, used, and licensed by or for the Government for governmental purposes without the payment to me of any royalties thereon.

BACKGROUND OF THE INVENTION

In the past, various hydraulic or electro-mechanical systems have been developed for actuation of control fin, however these systems have not provided the high performance required in some applications.

Therefore, it is an object of this invention to provide a lightweight pneumatic system that can be used to drive a pneumatic motor that will have high performance.

Another object of this invention is to provide a system that has good stiffness, phase, and gain that will provide high performance in the pneumatic system.

Other objects and advantages of this invention will be obvious to those skilled in this art.

SUMMARY OF THE INVENTION

In accordance with this invention, a pneumatic servo system is provided that includes a toroidal shaped tank that is filled with an inert gas to a predetermined pressure with a heat squib type gas generator mounted on the toroidal shaped tank to further pressurize the inert gas within the toroidal shaped tank at the appropriate time and control means mounted on the tank for controlling the supply of inert gas to a pneumatic motor or a plurality of pneumatic motors. The control means includes an explosive actuated frangible valve that is actuated to open a fluid passage for the inert gas from the toroidal shaped tank to a sensor for sensing a predetermined pressure and to a filter for passing the inert gas to a pressure regulator for supplying the inert gas at a predetermined pressure to a manifold which distributes the inert gas to a plurality of pneumatic motors through two-way servo valves that control the supplying and exhausting of the inert gas to the pneumatic motors to do work.

BRIEF DESCRIPTION OF THE DRAWING

In the drawing:

The single FIGURE of the drawing is a schematic view partially in section of a pneumatic servo system in accordance with this invention.

DESCRIPTION OF THE PREFERRED EMBODIMENT

Referring now to the drawing, a pneumatic servo system according to this invention is illustrated and includes a toroidal shaped tank 10 that has filling means at 12 with a cover 14 that is ultimately welded to the tank to seal nitrogen gas 16 within tank 10. Heat squib or gas generator 18 is mounted on tank 10 and includes housing 20 with propellant 22 mounted therein to be ignited by a conventional igniter 24. Rupture diaphragm 26 seals the nitrogen gas contained in tank 10 from the solid propellant within housing 20. A filter 28 filters the gases from ignition of solid propellant 22 and the gas created by the burning of solid propellant 22 is communicated through filter 28 and outlets 30 into tank 10 at the appropriate time.

Control housing 32 contains a fluid passage therethrough that is initially sealed by a conventional piston actuated explosive valve 34. A partition 36 is ruptured by member 38 when explosive valve 34 is actuated to communicate the nitrogen gas from inlet passage 40 to outlet passage 42. Outlet passage 42 communicates with passage 44 and go/no go pressure switch 46 that is used to provide a signal to a launch circuit for a missile. Pressure switch 46 has the signal thereof utilized to preclude firing of a missile when insufficient gas pressure exists at outlet 42.

Filter 48 is mounted between outlet 42 and inlet 50 to pressure regulator 52 to filter out any impurities that may exist in the inert gas, such as nitrogen, that is being supplied to conventional pressure regulator 52. Pressure regulator 52 is one that is designed to reduce the pressure from inlet 50 to outlet 54 to a pressure at the outlet of 400 psi. This is accomplished by coaction of valve head 56 of pressure regulator 52 with valve seat 58. The outlet pressure of 400 psi is communicated from outlet 54 to manifold 60 which dispenses the inert gas to a plurality of servo actuators 62 (only one of which is shown) to supply and exhaust this inert gas to pneumatic motors 64 (only one of which is shown) for doing work. Servo valves 62 are electrically controlled in a conventional manner by actuation of the solenoids to control the position of spool valve 66 as desired.

Sizing of storage tank 10 for the control actuation system according to this invention involves a complicated set of interrelationships. Although the inert gas requirements of the servo system can be calculated from the servo characteristics and the duty cycle, the actual weight consumed depends on the stored inert gas temperature. This gas temperature depends in turn on the thermodynamics of the gas expansion in the storage tank and regulator. In addition, there is heat transfer into the gas from the gas storage container and plumbing and the thermal augmentation used in the system.

To provide an efficient system, the storage tank sizing is based on the physical and thermodynamic processes involved, and the results cover the complete range of operating conditions to assure accuracy of size. The heat transfer effect of the rocket blast tube in the missile skin is not included in the proposed tank size because analysis shows that these aiding effects are small due to film coefficients and time lag. The omission of these effects results in a slightly conservative storage tank size. The storage tank sizing considers the physical properties of the gas over the anticipated range of temperatures and pressure, thermal augmentation, and the effect of gas temperature on servo consumption.

Gas comsumption of the servo actuator, obtained expermentally and analytically, is used as an input to the analysis. Interaction of storage tank size are made over the ranges of temperature and duty cycle until an adequate size to fulfill the mission is obtained. As previously pointed out, nitrogen has been selected for the permanent inert gas because of its availability and low cost.

From analysis, it has been shown that a bottle volume of 360 in.$^3$, 3.6 lb of $N_2$ gas, and heat squib 18 are required for the specified duty cycles. Table I, hereinbelow, shows the inert gas storage container design and performance characteristics.

TABLE I
GAS STORAGE CONTAINER DEVELOPMENT AND PERFORMANCE CHARACTERISTICS

| STORAGE | | | OPERATING | | |
|---|---|---|---|---|---|
| N$_2$ Gas Temperature and Pressure before Squib Ignition | | | N$_2$ Gas Temperature and Pressure after Squib Ingition | | |
| Ambient Temperature ° F | Pressure psi | Factor of Safety Burst | Peak Temperature ° F | Peak Pressure psi | Factor of Safety (Burst) |
| +165 | 4825 | 3.15 | 525* | 9075* | 1.68* |
| +135 | 4500 | 3.38 | 488 | 8325 | 1.83 |
| +70 | 3800 | 4.0 | 420 | 7500 | 2.03 |
| −25 | 2875 | 5.28 | 329 | 6450 | 2.36 |
| N$_2$ Gas Storage Volume | | | 360 in$^3$ | | |
| N$_2$ Gas Charge Pressure | | | 3800 at 70° F | | |
| Burst Pressure | | | 15,200 psi | | |
| Proof Pressure | | | 12,000 psi | | |
| Weight of N$_2$ Gas | | | 3.6 lbs | | |
| Yield Tensile Strength | | | 290,000 psi | | |
| Propellant Wt | | | 0.15 lbs | | |
| Heat Added | | | 260 Btu | | |

*No gas usage.

Storage container 10 is made of maraging steel heat treated to a minimum yield strength of 290,000 psi for the fabrication of the toroidal shaped storage tank 10 because of its exceptional strength and toughness. The absence of a quenching operation in heat treating of this material is of significance in this fabrication because warpage is at a minimum and the cleaning of scale from the inside of a vessel of this shape is very difficult. The storage container fabrication also incorporates contoured walls to minimize weight.

Heat squib 18 is mounted on a wall of storage container 10 so as to discharge the gases thereof after rupture of disc 26 into storage container 10 and not directly into the walls themselves. When heat squib 18 is fired into the storage container 10, the available energy in storage container 10 is substantially increased by increasing the inert gas temperature and pressure. This is required for surface to surface mode and the maximum controllable range anticipated in a missile system of the type in which this system is designed to be used. The heat squib is adopted to lessen the penalty encountered by cold gas systems where the storage container must be sized for low operating temperatures and stressed low enough to achieve long term storage without delayed failure.

Propellant 22 of heat squib 18 is a propellant of a type which has an ultraclean burning formulation and proven storage life. The propellant also has a stable burn rate at high chamber pressures. Heat squib 18 used in this invention is fabricated to produce a gas weight flow of approximately 0.0378 pounds per second for a four second duration. This provides approximately 260 BTU's of heat to the stored inert nitrogen gas.

In operation, with tank 10 filled with the inert nitrogen gas 16, the system is ready for activation and an electrical signal from a launcher or control center (not shown) is sent to the actuator of explosive valve 34 and to igniter 24 of heat squib 18 simultaneously to further pressurize inert gas 16 and open the gas flow from passage 40 to passage 42. At the same time inert gas is supplied to passage 42, it is also supplied to passage 44 and to go/no go pressure switch 46 that is connected into the system to prevent the control or actuation of servo valves 62 that control the work done by pneumatic motor 64. If the pressure at outlet 42 is sufficient, it passes through filter 48 and between valve head and seat 56 and 58 of pressure regulator 52 that supplies the regulated pressure at outlet 54 at about 400 psi to manifold 60 which supplies the inert gas to servo valves 62 that supply and exhaust the inert gas from pneumatic motors 64 to do work and drive appropriate devices. As can be seen, servo valves 62 are capable of driving pneumatic motors 64 in either direction.

I claim:

1. A pneumatic servo system comprising a container filled with inert gas, a heat squib mounted on the side of said container for heating the inert gas and increasing the pressure thereof when the heat squib has been ignited, an outlet from said container, control means connected to said outlet from said container a pressure regulator having an inlet, said control means including a piston actuated explosive valve interconnecting the outlet from said container to said inlet of said pressure regulator, a manifold outlet, and said pressure regulator being connected to said manifold outlet for delivering said inert gas to said manifold outlet at a predetermined pressure.

2. A pneumatic servo system as set forth in claim 1, wherein said heat squib has a rupturable diaphragm mounted therein to seal propellant of the heat squib from the inert gas in said container until said propellant has been ignited to cause said diaphragm to rupture and deliver heat and gas from the heat squib into the container.

3. A pneumatic servo system as set forth in claim 2, wherein a go/no go pressure switch is mounted between the piston actuated explosive valve and the pressure regulator to monitor the pressure being delivered to the pressure regulator.

4. A pneumatic servo system as set forth in claim 3, wherein said heat squib has outlet means therefrom that exhaust into said container so as to have the gases thereof vented directly into the tank and away from the inner walls of said tank.

5. A pneumatic servo system as set forth in claim 4, wherein said container is a toroidal shaped container.

* * * * *